United States Patent
Milosevski et al.

(10) Patent No.: US 9,516,476 B2
(45) Date of Patent: Dec. 6, 2016

(54) TELECONFERENCING SYSTEM, METHOD OF COMMUNICATION, COMPUTER PROGRAM PRODUCT AND MASTER COMMUNICATION DEVICE

(71) Applicant: NXP B.V., Eindhoven (NL)

(72) Inventors: Vlatko Milosevski, Eindhoven (NL); Edwin Zuidema, Eindhoven (NL); Ralf Funken, Waalre (NL)

(73) Assignee: NXP B.V., Eindhoven (NL)

( * ) Notice: Subject to any disclaimer, the term of this patent is extended or adjusted under 35 U.S.C. 154(b) by 64 days.

(21) Appl. No.: 14/151,732

(22) Filed: Jan. 9, 2014

(65) Prior Publication Data
US 2014/0194059 A1 Jul. 10, 2014

(30) Foreign Application Priority Data
Jan. 10, 2013 (EP) .................................... 13150821

(51) Int. Cl.
*H04W 4/00* (2009.01)
*H04W 4/06* (2009.01)
(Continued)

(52) U.S. Cl.
CPC ............. *H04W 4/06* (2013.01); *H04B 5/0031* (2013.01); *H04M 1/7253* (2013.01);
(Continued)

(58) Field of Classification Search
None
See application file for complete search history.

(56) References Cited

U.S. PATENT DOCUMENTS

2003/0044654 A1 3/2003 Holt
2006/0153352 A1* 7/2006 Schmidt .............. H04L 12/1822
379/202.01
(Continued)

FOREIGN PATENT DOCUMENTS

CN 2667810 Y 12/2004
CN 1859513 A 11/2006
(Continued)

OTHER PUBLICATIONS

Extended European Search Report for patent appl. No. EP13150821.0 (Jun. 13, 2013).

*Primary Examiner* — Alejandro Rivero (57) ABSTRACT

According to an aspect of the invention a teleconferencing system is conceived, which teleconferencing system comprises a master communication device and a plurality of satellite communication devices, wherein the master communication device is arranged to communicate with a far-end communication device through a global communication channel and to communicate with the plurality of satellite communication devices through a plurality of local communication channels, wherein the master communication device is further arranged to act as a portal between the far-end communication device and the satellite communication devices by forwarding voice communications received from the far-end communication device to the satellite communication devices through the local communication channels, and by mixing voice communications received from the satellite communication devices into a unified voice signal and sending said unified voice signal to the far-end communication device through the global communication channel.

21 Claims, 2 Drawing Sheets

(51) Int. Cl.
    *H04B 5/00*     (2006.01)
    *H04W 84/18*     (2009.01)
    *H04M 1/725*     (2006.01)
    *H04M 1/60*     (2006.01)
    *H04M 3/56*     (2006.01)

(52) U.S. Cl.
    CPC .......... *H04W 84/18* (2013.01); *H04M 1/6066* (2013.01); *H04M 3/56* (2013.01); *H04M 2250/02* (2013.01); *H04M 2250/62* (2013.01)

(56) References Cited

U.S. PATENT DOCUMENTS

| | | | |
|---|---|---|---|
| 2006/0285671 A1* | 12/2006 | Tiruthani | H04M 3/382 379/202.01 |
| 2007/0133437 A1 | 6/2007 | Wengrovitz et al. | |
| 2008/0139239 A1* | 6/2008 | O'Connor | H04L 12/189 455/552.1 |
| 2008/0159507 A1 | 7/2008 | Virolainen et al. | |
| 2009/0011753 A1* | 1/2009 | Barnier | H04B 5/0062 455/422.1 |
| 2009/0052351 A1 | 2/2009 | James et al. | |
| 2009/0111444 A1 | 4/2009 | Sassi | |
| 2009/0264114 A1 | 10/2009 | Virolainen et al. | |
| 2010/0015955 A1 | 1/2010 | Backlund et al. | |
| 2010/0189240 A1* | 7/2010 | Miller et al. | 379/202.01 |
| 2010/0227598 A1* | 9/2010 | Roach | 455/417 |
| 2011/0065384 A1* | 3/2011 | Cader et al. | 455/41.1 |
| 2012/0058754 A1* | 3/2012 | Couse et al. | 455/416 |
| 2012/0224714 A1* | 9/2012 | Couse et al. | 381/92 |
| 2012/0300646 A1 | 11/2012 | Sloyer et al. | |
| 2012/0311090 A1 | 12/2012 | Locker et al. | |
| 2012/0327175 A1* | 12/2012 | Couse | 348/14.08 |
| 2013/0029596 A1* | 1/2013 | Preston | H04L 63/18 455/41.1 |

FOREIGN PATENT DOCUMENTS

| | | |
|---|---|---|
| CN | 1983949 A | 6/2007 |
| CN | 101080906 A | 11/2007 |
| CN | 101573955 A | 11/2009 |
| EP | 2 056 576 A1 | 5/2009 |
| EP | 2 426 903 A1 | 3/2012 |
| FR | 2 884 673 | 10/2006 |
| JP | 2003-92785 | 3/2003 |

\* cited by examiner

TELECONFERENCING SYSTEM, METHOD OF COMMUNICATION, COMPUTER PROGRAM PRODUCT AND MASTER COMMUNICATION DEVICE

CROSS-REFERENCE TO RELATED APPLICATIONS

This application claims the priority under 35 U.S.C. §119 of European patent application no. 13150821.0, filed on Jan. 10, 2013, the contents of which are incorporated by reference herein.

FIELD OF THE INVENTION

The invention relates to a teleconferencing system. The invention also relates to a method of communication. Furthermore, the invention relates to a computer program product. Furthermore, the invention relates to a master communication device.

BACKGROUND OF THE INVENTION

Nowadays, teleconferencing is a widely accepted means of communication during meetings in professional environments. Typically, teleconference participants gather together in a room around a so-called "tripod" (a teleconference device). Each participant carries his/her own phone, which lies unused on the desk around the tripod. Everyone leans forward to the tripod in order to listen to the incoming call and in order to be better understood when speaking to the far-end party at the other side of the telephone line.

Figure 1:
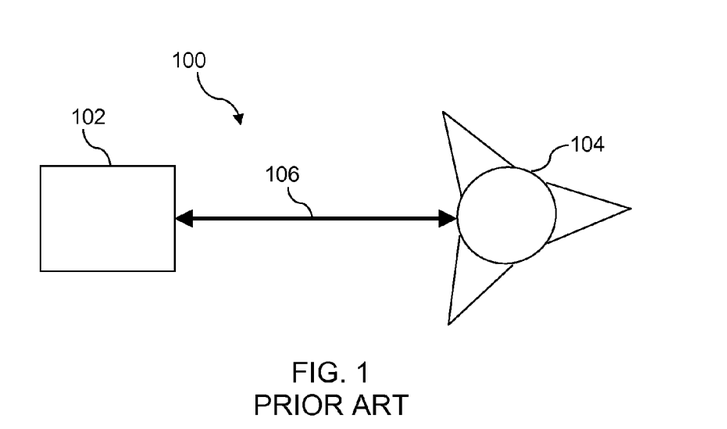
FIG. 1 illustrates a conventional teleconferencing system.

FIG. 1 illustrates a conventional teleconferencing system. The conventional teleconferencing system 100 comprises a so-called tripod 104 which communicates with a far-end communication device 102 through a global communication channel 106. The global communication channel 106 may, for example, be realized as a landline connection, a cellular network connection, a Voice over IP (VoIP) connection, a satellite connection, or a combination thereof.

Conventional teleconferencing systems suffer from a number of problems. For example, it is quite common that a far-end party is difficult to understand, because the room in which the tripod is located is crowded or because the room has bad acoustic properties. Also, it is often difficult to be understood by the far-end party, because the user who speaks is positioned far from the tripod. Furthermore, there is almost no freedom of movement for the participants and there is often a lack of personal space during the conference call. There is also a lack of control over the volume levels for each participant in the conference call. Furthermore, personal live call recording is not possible, and the personal status of the individual in a conference call cannot be seen. In general, there is a lack of information about who has entered or left the conference call. Furthermore, personal equipment, such as headphones, cannot be used, and the conference session cannot be recorded locally by a participant. Finally, the speech processing (e.g. Acoustic Echo Cancellation, Background Noise Suppression, and Audio Gain Control) is sub-optimal, because it is performed by the tripod, which disregards the location of the speakers in the teleconference. Moreover, since everyone speaks to the tripod, the "Hands Free" or "Speakerphone" mode is mandatory.

Similar problems exist in other communication systems, such as standard peer-to-peer telephone calls. In a standard peer-to-peer telephone call, it is not possible for another user to join the call or to listen in, but it would certainly be useful to enable such functionality.

SUMMARY OF THE INVENTION

It is an object of the invention to overcome, at least partially, the above-mentioned problems. More specifically, it is an object of the invention to improve a teleconferencing system of the kind set forth, in particular by enabling better and more comfortable shared calls with multiple participants. This object is achieved by a teleconferencing system as claimed in claim 1, a method of communication as claimed in claim 11, a computer program product as claimed in claim 12, and a master communication device as claimed in claim 13.

According to an aspect of the invention a teleconferencing system is conceived, which teleconferencing system comprises a master communication device and a plurality of satellite communication devices, wherein the master communication device is arranged to communicate with a far-end communication device through a global communication channel and to communicate with the plurality of satellite communication devices through a plurality of local communication channels, wherein the master communication device is further arranged to act as a portal between the far-end communication device and the satellite communication devices by forwarding voice communications received from the far-end communication device to the satellite communication devices through the local communication channels, and by mixing voice communications received from the satellite communication devices into a unified voice signal and sending said unified voice signal to the far-end communication device through the global communication channel.

According to an exemplary embodiment of the teleconferencing system, the master communication device is arranged to establish the local communication channels by performing NFC-based pairing procedures with prospective satellite communication devices.

According to a further exemplary embodiment of the teleconferencing system, the master communication device and the prospective satellite communication devices comprise respective NFC interface devices for performing said NFC-based pairing procedures.

According to a further exemplary embodiment of the teleconferencing system, the local communication channels are Wi-Fi Direct communication channels or Bluetooth communication channels.

According to a further exemplary embodiment of the teleconferencing system, the voice communications exchanged between the master communication device and the satellite communication devices conform to a Voice over IP protocol.

According to a further exemplary embodiment of the teleconferencing system, the master communication device is further arranged to grant a particular satellite communication device the right to endorse the joining of a prospective satellite communication device into the local network formed by said local communication channels.

According to a further exemplary embodiment of the teleconferencing system, the master communication device is further arranged to perform signal control on the voice communications received from the satellite communication devices.

According to a further exemplary embodiment of the teleconferencing system, the master communication device is further arranged to exchange text messages with the satellite communication devices.

According to a further exemplary embodiment of the teleconferencing system, the master communication device is further arranged to reestablish a particular local communication channel when the speech quality of voice communications received through said local communication channel falls below a predetermined threshold.

According to a further exemplary embodiment of the teleconferencing system, the satellite communication devices are arranged to perform local signal control on the voice communications transmitted to the master communication device and to notify the master communication device about a performed local signal control.

According to another aspect of the invention a method of communication is conceived between a master communication device and a plurality of satellite communication devices in a teleconferencing system, wherein the master communication device communicates with a far-end communication device through a global communication channel and communicates with the plurality of satellite communication devices through a plurality of local communication channels, wherein the master communication device acts as a portal between the far-end communication device and the satellite communication devices by forwarding voice communications received from the far-end communication device to the satellite communication devices through the local communication channels, and by mixing voice communications received from the satellite communication devices into a unified voice signal and sending said unified voice signal to the far-end communication device through the global communication channel.

According to a further aspect of the invention a computer program product is conceived, which computer program product comprises program elements executable by a master communication device or a satellite communication device in a teleconferencing system, wherein each program element comprises program instructions which, when being executed by the master communication device or the satellite communication device, cause said master communication device and satellite communication device to carry out or control respective steps of a method of the kind set forth.

According to a further aspect of the invention, a master communication device for use in a teleconferencing system is conceived, said teleconferencing system comprising the master communication device and a plurality of satellite communication devices, wherein the master communication device is arranged to communicate with a far-end communication device through a global communication channel and to communicate with the plurality of satellite communication devices through a plurality of local communication channels, wherein the master communication device is further arranged to act as a portal between the far-end communication device and the satellite communication devices by forwarding voice communications received from the far-end communication device to the satellite communication devices through the local communication channels, and by mixing voice communications received from the satellite communication devices into a unified voice signal and sending said unified voice signal to the far-end communication device through the global communication channel.

BRIEF DESCRIPTION OF THE DRAWINGS

The invention will be described in more detail with reference to the appended drawings, in which.

DESCRIPTION OF EMBODIMENTS

FIG. 1 illustrates a conventional teleconferencing system. As described above, the conventional teleconferencing system 100 comprises a so-called tripod 104 which communicates with a far-end communication device 102 through a global communication channel 106.

Figure 2:
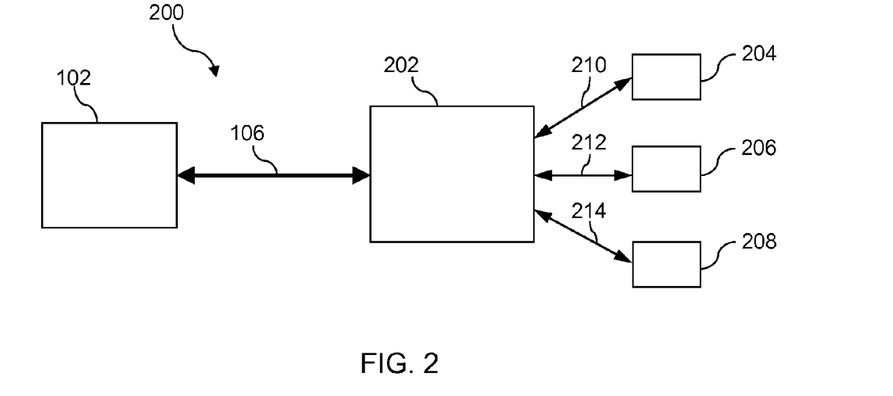
FIG. 2 illustrates an exemplary embodiment of a teleconferencing system according to the invention.

FIG. 2 illustrates an exemplary embodiment of a teleconferencing system according to the invention. Instead of a conventional tripod, the teleconferencing system 200 comprises a master communication device 202 and a plurality of satellite communication devices 204, 206, 208. The master communication device 202 communicates with a far-end communication device 102 through a global communication channel 106. The master communication device 202 communicates with the plurality of satellite communication devices 204, 206, 208 through a plurality of local communication channels 210, 212, 214.

In operation, the master communication device 202 acts as a portal between the far-end communication device 102 and the satellite communication devices 204, 206, 208 by forwarding voice communications received from the far-end communication device 102 to the satellite communication devices 204, 206, 208 through the local communication channels 210, 212, 214, and by mixing voice communications received from the satellite communication devices 204, 206, 208 into a unified voice signal and sending said unified voice signal to the far-end communication device 102 through the global communication channel 106.

For example, the master communication device 202 may be a smart phone, a tablet or another device which contains NFC connectivity, Wi-Fi Direct support or Bluetooth support, and the capability to make cellular or VoIP calls. Each teleconference participant can now connect his/her personal device, i.e. a prospective satellite communication device, to the master communication device 202 via NFC-based pairing, for example. In particular, data required for setting up a local communication channel between the master communication device 202 and the prospective satellite communication device—for example a network identifier, such as a Service Set Identifier (SSID) for Wi-Fi, and a corresponding network password—can be exchanged via NFC. Subsequently, the local communication channel can be established and voice communications can be exchanged between the master communication device 202 and the particular satellite communication device via the newly established local communication channel. Then, the owner of the satellite communication device is free to move away from the teleconference room.

For example, a participant may go back to his/her desk and participate in the teleconference from there using the satellite communication device. The satellite communication device may be personal device such as a mobile phone. The participant may also enjoy an improved speech quality and intelligibility by bringing his/her satellite communication device closer to his/her mouth or ear or by connecting a personal accessory, for example headphones and a microphone. The participant may also record the teleconference on his/her satellite communication device.

Furthermore, the quality of the teleconferencing session will be enhanced. In particular, with each new satellite connection, text messages can be exchanged with the master communication device 202 locally and/or with the far-end communication device 102. The master communication device 202 will have the possibility to exert some control over the participants in the teleconference by muting/unmuting respective satellite communication devices 204, 206, 208 or by fine-tuning the volume level of the voice communications received from said satellite communication devices 204, 206, 208. Furthermore, since each participant can use his/her personal device to participate in the teleconference, the speech processing for each participant can be conducted on the personal device, which may provide improved Acoustic Echo Cancellation and Background Noise Suppression.

Figure 3:
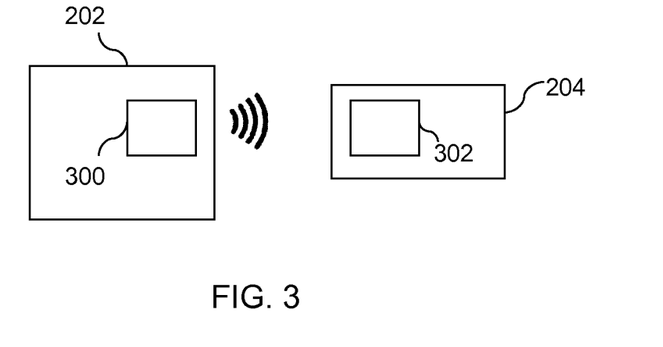
FIG. 3 illustrates the pairing of a master communication device and a satellite communication device by means of Near-Field Communication.

FIG. 3 illustrates the pairing of a master communication device and a satellite communication device by means of Near-Field Communication (NFC). According to an exemplary embodiment of the teleconferencing system, the master communication device 202 may establish local communication channels by performing NFC-based pairing procedures with prospective satellite communication devices. Thus, according to this exemplary embodiment, the master communication device 202 and a prospective satellite communication device 204 comprise respective NFC interface devices 300, 302 for performing an NFC-based pairing procedure. The NFC-based pairing procedure may comprise the exchange of data required for setting up a local communication channel, such as a network identifier or name and a network password specific to a Local Area Network (LAN).

According to a further exemplary embodiment of the teleconferencing system, the local communication channels are Wi-Fi Direct communication channels or Bluetooth communication channels. Furthermore, the voice communications exchanged between the master communication device and the satellite communication devices may conform to a Voice over IP (VoIP) protocol.

Figure 4:
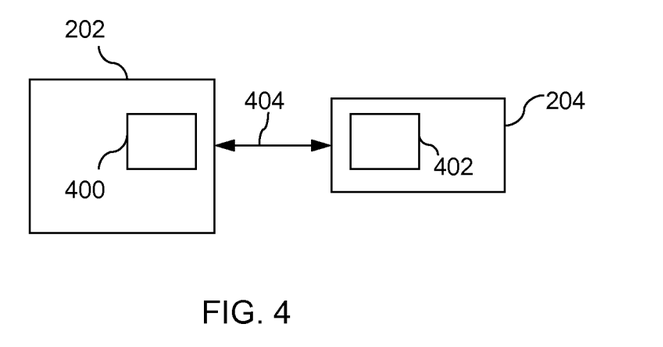
FIG. 4 illustrates a first exemplary embodiment of a local communication channel between a master communication device and a satellite communication device.

FIG. 4 illustrates a first exemplary embodiment of a local communication channel between a master communication device and a satellite communication device. In this case, the local communication channel is a Wi-Fi Direct communication channel 404. The master communication device 202 and the prospective satellite communication device 204 comprise respective Wi-Fi Direct interface devices 400, 402 for establishing said Wi-Fi Direct communication channel 404.

Figure 5:
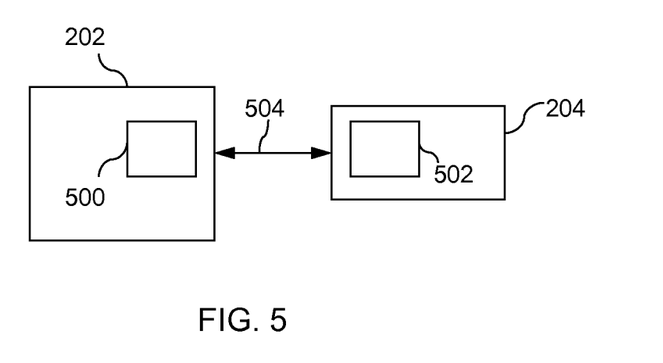
FIG. 5 illustrates a second exemplary embodiment of a local communication channel between a master communication device and a satellite communication device.

FIG. 5 illustrates a second exemplary embodiment of a local communication channel between a master communication device and a satellite communication device. In this case, the local communication channel is a Bluetooth communication channel 504. The master communication device 202 and the prospective satellite communication device 204 comprise respective Bluetooth interface devices 500, 502 for establishing said Bluetooth communication channel 504.

The master communication device 202 and the satellite communication devices 204, 206, 208 may be provided with program elements, such as downloadable software, for performing the above-described functions. As an alternative to downloadable software applications, the functionality may be provided as embedded features in the master communication device 202 and the satellite communication devices 204, 206, 208, in the form of software, hardware or a combination thereof Furthermore, the master communication device 202 and the satellite communication devices 204, 206, 208 may comprise a Graphical User Interface (GUI) which allows an end-user to control at least a part of the above-described functions.

Thus, referring back to FIG. 2, the master communication device 202 may implement the following functions. The master communication device 202 may establish a cellular or VoIP call with a remote user, i.e. far-end calling party, who uses a far-end communication device 102, through a global communication channel 106. The skilled person will appreciate that the global communication channel 106 may also be realized differently, for example as a landline connection, a satellite connection or a connection based on various technologies.

The master communication device 202 may accept the connection with a particular one of the satellite communication devices 204, 206, 208 via NFC-based pairing, for example by endorsing the connection of the particular satellite communication device into the Local Area Network (LAN). Optionally, the master communication device 202 may endorses the connection of said particular satellite communication device into the LAN and also grant the right to the endorsed particular satellite communication device to endorse further satellite communication devices into the LAN. Thus, according an exemplary embodiment of the teleconferencing system 200, the master communication device 202 is further arranged to grant a particular satellite communication device the right to endorse the joining of a prospective satellite communication device into the local network formed by said local communication channels.

Furthermore, the master communication device 202 may establish a Wi-Fi Direct voice communication based on a local VoIP protocol or a Bluetooth incoming voice communication with all connected satellite communication devices 204, 206, 208. The master communication device 202 performs a mixing of all outgoing voice communications from each of the connected satellite communication devices 204, 206, 208 into a unified outgoing voice signal to be transmitted to the far-end communication device 102.

Optionally, the master communication device 202 may perform signal control on each signal coming from the connected satellite communication devices 204, 206, 208, such as mute/un-mute and volume control operations. Thus, according to a further exemplary embodiment of the teleconferencing system 200, the master communication device 202 is further arranged to perform signal control on the voice communications received from the satellite communication devices 204, 206, 208. Additionally, it may notify the satellite communication devices 204, 206, 208 about performed signal control operations.

According to a further exemplary embodiment of the teleconferencing system 200, the master communication device 202 may exchange text messages with the satellite communication devices 204, 206, 208. This may further improve the user-friendliness of the teleconferencing system.

The master communication device 202 may also maintain the speech quality with each of the connected satellite communication devices 204, 206, 208, in particular by reestablishing the Wi-Fi Direct or Bluetooth communication channel with a particular one of the communication devices 204, 206, 208 when low speech quality has been detected. Thus, according to a further exemplary embodiment of the teleconferencing system 200, the master communication device 202 is further arranged to reestablish a particular local communication channel when the speech quality of voice communications received through said local communication channel falls below a predetermined threshold.

Referring back to FIG. 2, a satellite communication device 204, 206, 208 may implement the following functions. The satellite communication device 204, 206, 208 may establish a local communication channel 210, 212, 214 with the master communication device 202 via NFC-based pairing. Furthermore, it may establish a Wi-Fi Direct or Bluetooth incoming voice communication with the connected master communication device 202. The satellite communication device 204, 206, 208 may reproduce a voice communication received from the master communication device 202 via its built-in speaker, earpiece or headphones. Furthermore, the satellite communication device 204, 206, 208 may capture the user speech via its built-in microphone and transmit the resulting speech signal, i.e. the voice communication, to the master communication device 202. The connected satellite communication devices 204, 206, 208 may further exchange text messages with the master communication device 202 and between each other.

Additionally, the satellite communication device 204, 206, 208 may perform local signal control, such as mute/un-mute and volume control operations, and inform the master communication device 202 about the performed control action. Thus, according to a further exemplary embodiment of the teleconferencing system 200, the satellite communication devices 204, 206, 208 are arranged to perform local signal control on the voice communications transmitted to the master communication device 202 and to notify the master communication device 202 about a performed local signal control.

In a specific implementation, the control protocol between the master communication device 202 and the satellite communication devices 204, 206, 208, may contain the following elements.

"NFC Pairing" control messages

Each device will have its unique "Name" or "ID", for example a user's name, or phone number, or employee ID.

During NFC Pairing the master communication device 202 can grant access to a satellite communication device 204, 206, 208 into its Wi-Fi Direct network (or Bluetooth network).

If the access is granted, the master communication device 202 will send via NFC the SSID and the password of its Wi-Fi network, such that the satellite communication device 204, 206, 208 can connect to that wireless network.

The master communication device 202 can give either "Standard" access to the satellite communication device 204, 206, 208 in question, or a "Privileged" access to said satellite communication device 204, 206, 208.

If the satellite communication device 204, 206, 208 device gets a "Privileged" access, then it can also grant access to other satellite communication devices 204, 206, 208, by sharing the SSID and the password with said other satellite communication devices 204, 206, 208 via NFC touch.

Local Voice over IP streaming control messages

During the active call, the master communication device 202 device will have to share the incoming speech signal from the far-end communication device 102 with all connected satellite communication devices 204, 206, 208 and receive and mix the out-going speech signals from all connected satellite communication devices 204, 206, 208. The exchange of the speech signals, i.e. the voice communications, between the master communication device 202 and the satellite communication devices 204, 206, 208 will be conducted via Voice over IP protocols.

Upon each "NFC Pairing", the master communication device 202 will establish a VoIP connection and start streaming with the paired satellite communication devices 204, 206, 208.

When a satellite communication device 204, 206, 208 terminates the call locally, it will send a notification to the master communication device 202, such that the master communication device 202 will terminate the VoIP connection with that satellite communication device 204, 206, 208.

When the cellular or VoIP connection between the master communication device 202 and the far-end communication device 102 is terminated, the master communication device 202 will terminate all active VoIP connections with the satellite communication devices 204, 206, 208. The satellite communication devices 204, 206, 208 will confirm to the master communication device 202 that they have received a "Call Termination" command.

Mute/Un-Mute control messages

When a master communication device 202 mutes or un-mutes a satellite communication device 204, 206, 208, it will inform that satellite communication device 204, 206, 208 about this control action. The satellite communication device 204, 206, 208 will confirm to the master communication device 202 that it has received the mute or un-mute command. The Graphical User Interface (GUI) of the satellite communication device 204, 206, 208 will reflect the muted or un-muted state.

If a user mutes or un-mutes his/her satellite communication device 204, 206, 208, the satellite communication device 204, 206, 208 will inform the master communication device 202 about the action. The master communication device 202 will confirm to the satellite communication device 204, 206, 208 that it has received the command. The GUI of the master communication device 202 will reflect the muted or un-muted state of the satellite communication device 204, 206, 208. In this case, the master communication device 202 device only streams the incoming speech to the satellite communication device 204, 206, 208 and does not perform any reception or mixing of incoming speech signals from the muted satellite communication device 204, 206, 208, in order to reduce the power consumption in the local VoIP network.

Text message exchanges

The master communication device 202 and the satellite communication device 204, 206, 208 may exchange use-case related text messages. For example:

The teleconference participant can send a message from his/her satellite communication device 204, 206, 208 to the master communication device 202, and said message may include the participant's name and status (for example, "Participant X is listening and working on . . . ").

The teleconference participant can send a message to the master communication device 202 that he/she is recording the teleconference session.

The text messages from the satellite communication devices 204, 206, 208 can be tagged to indicate that they are only meant for the master communication device 202, or that they are public and can be seen and displayed by any other satellite communication device 204, 206, 208 or also by the far-end communication device 102.

Special control messages

A satellite communication device 204, 206, 208 may send a "Bad VoIP quality" message to the master communication device 202 if VoIP packets have been lost, or if the overall quality of the incoming/outgoing communication with the master communication device 202 falls below a predetermined quality threshold. In that case, the master communication device 202 may reestablish the VoIP connection with the satellite communication device 204, 206, 208 in question.

It is noted that the drawings are schematic. In different drawings, similar or identical elements are provided with the same reference signs. Furthermore, it is noted that in an effort to provide a concise description of the exemplary embodiments, implementation details which fall into the customary practice of the skilled person may not have been described. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMBERS 100 conventional teleconferencing system
102 far-end communication device
104 conventional tripod
106 global communication channel
200 embodiment of a teleconferencing system
202 master communication device
204 satellite communication device
206 satellite communication device
208 satellite communication device
210 local communication channel
212 local communication channel
214 local communication channel
300 NFC interface device
302 NFC interface device
400 Wi-Fi Direct interface device
402 Wi-Fi Direct interface device
404 Wi-Fi Direct communication channel
500 Bluetooth interface device
502 Bluetooth interface device
504 Bluetooth communication channel

The invention claimed is:

1. A teleconferencing system comprising:
a master communication device; and
a plurality of satellite communication devices, wherein each of the master communication device and the plurality of satellite communication devices include communication circuitry configured and arranged for transmitting and receiving signals,
wherein the master communication device is arranged to communicate with a far-end communication device, which includes communications circuitry, through a global communication channel and to communicate with the plurality of satellite communication devices through a plurality of local communication channels,
wherein the master communication device is further arranged to act as a portal between the far-end communication device and the plurality of satellite communication devices by:
forwarding voice communications received from the far-end communication device to the plurality of satellite communication devices through the local communication channels,
mixing voice communications received from the plurality of satellite communication devices into a unified voice signal and sending said unified voice signal to the far-end communication device through the global communication channel,
characterized in that the master communication device is arranged to establish the local communication channels by performing NFC-based pairing procedures with prospective satellite communication devices, wherein the NFC-based pairing procedures include the master communication device configured and arranged to accept the NFC-based pairing by granting connections of the prospective satellite communication devices into a local network formed by said local communication channels.

2. A teleconferencing system as claimed in claim 1, wherein the master communication device and the prospective satellite communication devices comprise respective NFC interface devices for performing said NFC-based pairing procedures, and wherein, in response to the granting of connections, the master communication device is configured and arranged to exchange data with the prospective satellite communication devices such that the prospective satellite communication devices are configured to connect to the local network, the exchanged data including a network identifier and a network password specific to the local network.

3. A teleconferencing system as claimed in claim 1, wherein the local communication channels are Wi-Fi Direct communication channels or Bluetooth communication channels and wherein the master communication device is further configured to maintain speech quality with the plurality of satellite communication devices by re-establishing a WI-Fi direct or Bluetooth communication channels with at least one of the plurality of satellite communication devices in response to a speech quality falling below a threshold.

4. A teleconferencing system as claimed in claim 1, wherein the voice communications exchanged between the master communication device and the plurality of satellite communication devices conform to a Voice over IP protocol and wherein the plurality of satellite communication devices are configured to terminate a VoIP locally and send a notification to the master communication device and the master communication device is configured to terminate the respective VoIP in response to the notification.

5. A teleconferencing system as claimed in claim 1, wherein the master communication device is further arranged to grant a particular satellite communication device a right to endorse joining of a prospective satellite communication device into the local network formed by said local communication channels in which the particular satellite communication device is configured to directly grant connection of the prospective satellite communication device into the local network.

6. A teleconferencing system as claimed in claim 1, wherein the master communication device is further arranged to perform signal control on the voice communications received from the plurality of satellite communication devices, wherein signal control includes a volume control operation performed on a voice communication received from at least one of the plurality of satellite communication devices such that each voice communication is present in the unified voice signal.

7. A teleconferencing system as claimed in claim 1, wherein the master communication device is further arranged to exchange text messages with the plurality of satellite communication devices.

8. A teleconferencing system as claimed in claim 1, wherein the master communication device is further arranged to reestablish a particular local communication channel in response to speech quality of voice communications received through said local communication channel falling below a predetermined threshold.

9. A teleconferencing system as claimed in claim 1, wherein the plurality of satellite communication devices are arranged to perform local signal control on the voice communications transmitted to the master communication device and to notify the master communication device about a performed local signal control.

10. A teleconferencing system as claimed in claim 1, wherein the master communication device is a smartphone, or a tablet, including circuitry configured and arranged to communicate voice signals between the far-end communications device and the plurality of satellite communication devices, and including circuitry configured and arranged to communicate wirelessly with the plurality of satellite communication devices.

11. A teleconferencing system as claimed in claim 10, wherein the master communication device and the plurality of satellite communication devices are commonly located within proximal communication distance of each other for near-field communication capability, and wherein the far-end communications device is a telephony device, including communications circuitry, remotely located relative to a common location of the master communication device and the plurality of satellite communication devices.

12. A teleconferencing system as claimed in claim 1, wherein the master communication device is a smartphone, or a tablet, including circuitry configured and arranged to communicate voice signals between the far-end communications device and the plurality of satellite communication devices, wherein the master communication device and the plurality of satellite communication devices are commonly located within proximal communication distance of each other for near-field communication capability, and wherein the far-end communications device is a telephony device, including communications circuitry, remotely located relative to a common location of the master communication device and the plurality of satellite communication devices.

13. A teleconferencing system as claimed in claim 1, wherein the master communication device is a smartphone, or a tablet, including circuitry configured and arranged to communicate voice signals between the far-end communications device and the plurality of satellite communication devices, and wherein the master communication device and the plurality of satellite communication devices are configured and arranged to provide audio control over a conference call to control audio between users of the far-end communications device and the plurality of satellite communication devices by communicating instruction signals from one or more of the plurality of satellite communication devices to the master communication device, whereby the master communication device effects the audio control.

14. A teleconferencing system as claimed in claim 13, wherein the master communication device is a smartphone, or a tablet, including circuitry configured and arranged to communicate voice signals between the far-end communications device and the plurality of satellite communication devices and to input user-provided signals for providing audio control over a conference call to control audio between users of the far-end communications device and the plurality of satellite communication devices, wherein the input user-provided signals for providing audio control include muting and unmuting control.

15. A teleconferencing system as claimed in claim 13, wherein the master communication device is a smartphone, or a tablet, including circuitry configured and arranged to communicate voice signals between the far-end communications device and the plurality of satellite communication devices and to receive instruction signals for providing audio control over a conference call to control audio involving the far-end communications device and the plurality of satellite communication devices, wherein the instruction signals for providing audio control include volume control.

16. A teleconferencing system as claimed in claim 1, wherein the master communication device is a smartphone, or a tablet, including circuitry configured and arranged to communicate voice signals between the far-end communications device and the plurality of satellite communication devices and to receive signals for providing audio control over a conference call to control audio involving the far-end communications device and the plurality of satellite communication devices, wherein user-provided signals for providing audio control include volume control by communicating instruction signals from one or more of the plurality of satellite communication devices to the master communication device, whereby the master communication device effects the audio control, wherein the master communication device and the plurality of satellite communication devices are commonly located within proximal communication distance of each other for near-field communication capability, wherein the far-end communications device is a telephony device, including communications circuitry, remotely located relative to a common location of the master communication device and the plurality of satellite communication devices.

17. A teleconferencing system as claimed in claim 1, wherein, in response to the granting of connections, the master communication device is configured and arranged to exchange a network identifier and a network password specific to the local network with the prospective satellite communication devices such that the prospective satellite communication devices are configured to connect to the local network.

18. A teleconferencing system as claimed in claim 1, wherein the master communication device is configured and arranged to terminate active VoIP connections with the prospective satellite communication devices responsive to a connection between the master communication device and the far-end communication device being terminated by sending a command to the prospective satellite communication devices, and wherein the prospective satellite communication devices are configured and arranged to confirm receipt of the command to the master communication device.

19. A teleconferencing system as claimed in claim 1, wherein the voice communications exchanged between the master communication device and the plurality of satellite communication devices conform to a Voice over IP protocol (VoIP) and wherein the plurality of satellite communication devices are configured to send a message to the master communication device in response to loss of a VoIP package or overall quality of communication falls below a predetermined threshold and the master communication device re-establishes a VoIP connection with the respective satellite communication device in response to the message.

20. A method of communication between a master communication device and a plurality of satellite communication devices in a teleconferencing system, wherein each of the master communication device and the plurality of satellite communication devices include communication circuitry configured and arranged for transmitting and receiving signals, wherein the master communication device communicates with a far-end communication device through a global communication channel and communicates with the plurality of satellite communication devices through a plurality of local communication channels, wherein the master communication device acts as a portal between the far-end communication device and the plurality of satellite communication devices by:

forwarding voice communications received from the far-end communication device to the plurality of satellite communication devices through the local communication channels, mixing voice communications received from the plurality of satellite communication devices into a unified voice signal and sending said unified voice signal to the far-end communication device through the global communication channel, characterized in that the master communication device establishes the local communication channels by performing NFC-based pairing procedures with prospective satellite communication devices, wherein the NFC-based pairing procedures include the master communication device configured and arranged to accept the NFC-based pairing by granting connections of the prospective satellite communication devices into a local network formed by said local communication channels.

21. A non-transitory computer program product comprising: a logic circuit including program instructions executable by a master communication device or a satellite communication circuit in a teleconferencing system, wherein the logic circuit includes program instructions which, when being executed by the master communication device or the satellite communication device, cause said master communication device and satellite communication device to carry out or control respective steps of a method of communication as claimed in claim 20.

* * * * *